US009301082B2

(12) United States Patent
Meyers et al.

(10) Patent No.: US 9,301,082 B2
(45) Date of Patent: Mar. 29, 2016

(54) MOBILE DEVICE SENSOR DATA SUBSCRIBING AND SHARING

(71) Applicant: Apple Inc., Cupertino, CA (US)

(72) Inventors: Libo C. Meyers, San Jose, CA (US); Anil K. Kandangath, San Francisco, CA (US); Xiaoyuan Tu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/099,516

(22) Filed: Dec. 6, 2013

(65) Prior Publication Data

US 2015/0163210 A1    Jun. 11, 2015

(51) Int. Cl.
*H04L 29/00* (2006.01)
*H04W 4/00* (2009.01)

(52) U.S. Cl.
CPC .................................. *H04W 4/005* (2013.01)

(58) Field of Classification Search
USPC ........................................................... 726/4
See application file for complete search history.

(56) References Cited

U.S. PATENT DOCUMENTS

| 7,734,315 | B2 | 6/2010 | Rathus et al. |
| 8,475,367 | B1 * | 7/2013 | Yuen et al. ................. 600/300 |
| 2011/0105097 | A1 | 5/2011 | Tadayon et al. |
| 2011/0239026 | A1 | 9/2011 | Kulik |
| 2011/0294465 | A1 | 12/2011 | Inselberg |
| 2012/0299754 | A1 | 11/2012 | Korn et al. |
| 2012/0310587 | A1 | 12/2012 | Tu et al. |
| 2013/0096817 | A1 | 4/2013 | Fauci |
| 2013/0099892 | A1 | 4/2013 | Tucker et al. |
| 2013/0103200 | A1 | 4/2013 | Tucker et al. |
| 2013/0210406 | A1 | 8/2013 | Vidal et al. |
| 2015/0050923 | A1 | 2/2015 | Tu et al. |

OTHER PUBLICATIONS

U.S. Appl. No. 13/773,481, filed Feb. 21, 2013, entitled, "Automatic Identification of Vehicle Location," 57 pages, (unpublished).
U.S. Appl. No. 13/773,546, filed Feb. 21, 2013, entitled, "Vehicle Location in Weak Location Signal Scenarios," 57 pages, (unpublished).
Kwapisz, Jennifer R., et al., "Activity Recognition Using Cell Phone Accelerometers," SensorKDD '10, Jul. 25, 2010, Washington, D.C., USA, 9 pages.

* cited by examiner

*Primary Examiner* — Jeffrey Pwu
*Assistant Examiner* — Michael D Anderson
(74) *Attorney, Agent, or Firm* — Kilpatrick Townsend & Stockton LLP (57) ABSTRACT

Techniques for mobile devices to subscribe and share raw sensor data are provided. The raw sensor data associated with sensors (e.g., accelerometers, gyroscopes, compasses, pedometers, pressure sensors, audio sensors, light sensors, barometers) of a mobile device can be used to determine the movement or activity of a user. By sharing the raw or compressed sensor data with other computing devices, the other computing devices can determine a motion state based on the sensor data. Additionally, in some instances, the other computing devices can determine a functional state based on the sensor data and the motion state. For example, functional state classification can be associated with each motion state (e.g., driving, walking) by further describing each motion state (e.g., walking on rough terrain, driving while texting).

23 Claims, 9 Drawing Sheets

MOBILE DEVICE SENSOR DATA SUBSCRIBING AND SHARING

CROSS-REFERENCES TO RELATED APPLICATIONS

This application is related to commonly owned U.S. patent application Ser. No. 13/153,361, with Publication No. 2012/0310587, titled "ACTIVITY DETECTION," filed Jun. 3, 2011, and commonly owned U.S. patent application Ser. No. 14/065,224, titled "DETERMINING EXIT FROM A VEHICLE," filed Oct. 28, 2013, the disclosures of which are incorporated by reference in their entirety.

BACKGROUND

A person may want track and analyze one's own movement for a variety of reasons, such as for exercise and other health reasons. Current implementations use devices attached to a persons wrist to track some movement information. Further, a family of a user (e.g., of an elderly person) may want to track motion of that user, e.g., to identify if that user has fallen. Current implementations use devices that require the elderly person to push a button to activate a service.

Such implementations require purchase of a specialized device or service, which can add cost, and still require a user to upload data to other pesonal devices. Therefore, it is desirable to provide new methods, systems, and apparatuses for addressing the above issues.

BRIEF SUMMARY

Embodiments of the present invention can provide techniques for mobile devices to subscribe and share raw sensor data. The raw sensor data associated with sensors (e.g., accelerometer, gyroscope, compass, pedometer, pressure sensors, audio sensors, light sensors, barometers) of a mobile device can be used to determine the movement or activity of a user. By sharing the raw or compressed sensor data with other computing devices, the other computing devices can determine a motion state based on the sensor data. Additionally, in some instances, the other computing devices can determine a functional state based on the sensor data and the motion state.

For example, mobile device A can transmit the raw sensor data and an identifier associated with mobile device A. Another computing device (e.g., back-end sensor data server or another mobile device B) can receive the transmitted data from mobile device A. The received data can be analyzed to detect the identifier and to process the sensor data. Based on the analysis, a motion state classification can be determined. Optionally, a functional state classification can be determined based on the motion state and the sensor data.

Example motion states can include a stationary state, a walking state, a running state, and a driving state. A functional state can include a plurality of activities associated with each motion state. For example, functional state classification can be associated with each motion state (e.g., driving, walking) by further describing each motion state (e.g., walking on rough terrain, driving while texting). Example of functional state classification can include: determining that the user has fallen while walking; determining that the user is texting while driving; determining the height of a user's jump while walking or running Other embodiments are directed to systems, portable consumer devices, and computer-readable media associated with methods described herein.

A better understanding of the nature and advantages of embodiments of the present invention may be gained with reference to the following detailed description and the accompanying drawings.

DETAILED DESCRIPTION

Embodiments can be used to determine the specific activity of a user (e.g., motion state classification, functional state classification) based on raw or compressed sensor data received from a mobile device with one or more sensors. The determination of the specific activity can be used for various functions. In some instances, a determination of a specific event based on the received sensor data can prompt certain actions to be taken after such determination.

For example, mobile device A associated with user A can include certain types of sensors, such as, but not limited to: accelerometers, gyroscopes, compasses, pedometers, pressure sensors, audio sensors, light sensors, barometers, global positioning system (GPS) units, cameras and wireless circuitry. These sensors can generate raw sensor data, which can be used to determine user A's motion state and functional state associated with the determined motion state. Additionally, any computing device (e.g., mobile devices B-D) can subscribe to the sensor data (e.g., raw sensor data) of mobile device A.

An authorization to receive (e.g., subscribe to) the sensor data may be required before the other computing devices are allowed to receive the sensor data. In some instances, permission needs to be granted before the other computing devices can receive the transmitted sensor data. An authorization example can include a handshake between transmitting mobile device A and receiving mobile devices B-D. In some arrangements, a handshake can be required before the receiving devices can subscribe to the sensor data from the transmitting device.

In another authorization example, a server in communication with the mobile device can use a permission table to determine the mobile devices that are authorized to receive the sensor data from mobile device A. The permission table can be updated when the mobile device (e.g., mobile device A) that is transmitting the sensor data authorizes other mobile devices to subscribe to its sensor data.

Optionally, the generated raw data from the sensor(s) can be compressed before being transmitted by mobile device A. In some instances, the raw sensor data can be compressed before being transmitted (e.g., shared) using compression techniques. An example of a compression technique can include identifying similar raw sensor data in consecutive timeframes, and transmitting those similar raw sensor data as a single data value with its associated time duration. For example, if a mobile device is stationary on a table from $t_1$ to $t_2$, then the compressed file can simply be a single raw data value and the specific time duration (e.g., from $t_1$ to $t_2$), rather than raw data values associated with each timeframe for the entire duration.

I. Techniques for Sharing Sensor Data

Embodiments can provide an environment for mobile device A to share its sensor data, and for other users to subscribe to and determine the activities associated with mobile device A. The sensor data received by the subscribed device can either be raw sensor data, compressed sensor data or post-processed sensor. As further described below, many different arrangements can be derived, based on this environment.

A. System Diagram

Figure 1:
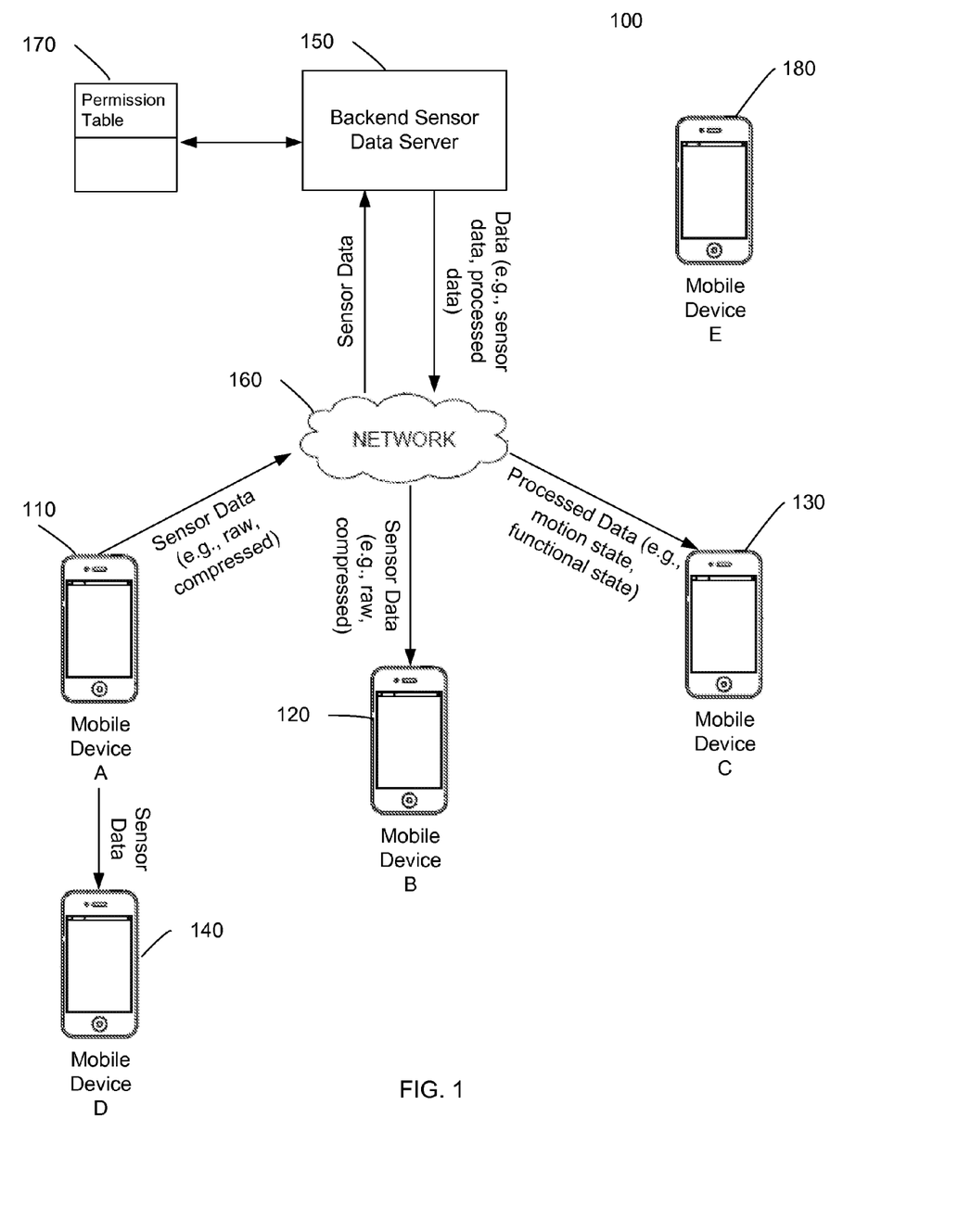
FIG. 1 is a system diagram 100 for sharing the sensor data, according to embodiments of the present invention.

FIG. 1 is a system diagram 100 for sharing the sensor data according to embodiments of the present invention. As illustrated in FIG. 1, mobile device A 110 associated with user A can upload sensor data to the a server 150 via a network 160. As examples, the sensor data can be sent to server 150 periodically or upon command (e.g., in response to input from a user). FIG. 1 depicts various example arrangements.

According to a first arrangement, mobile device B 120 can subscribe to the sensor data of mobile device A 110, and receive the raw or compressed sensor data from the backend sensor data server 150. In this first arrangement, mobile device B 120 can analyze the received sensor data and determine activities (e.g., motion state, functional state) based on the analyzed data.

As previously mentioned, the backend sensor data server 150 can use a permission table 170 to determine that mobile device B is authorized to receive the sensor data from mobile device A 110. After the sensor data is received by mobile device B 120, mobile device B 120 can determine a motion state, and a functional state for each motion state based on the received data.

In the first arrangement, the sensor data being transmitted and received is either raw or compressed. Depending on different embodiments, the sensor data can be compressed in mobile device A 110 or backend sensor data server 150 before being transmitted. Additionally, the received compressed sensor data can be decompressed into raw sensor data by the backend sensor data server 150 or mobile device B 120.

The first arrangement can be utilized to perform a notification. For example, the notification can include notifying the user of mobile device B 120 when the user of mobile device A 110 has fallen. Given that user A can fall from a known set of states (e.g., standing, walking, running), the motion state associated with this notification example can include either standing, walking or running Therefore, when it is determines that user A is standing, walking or running, mobile device B 120 analyzes the data to determine the functional state. When the functional state is determined that user A has fallen on the ground, a notification can be displayed on mobile device B 120. The notification can be triggered by a change in state to being on the ground, which can indicate a fall or being hurt or sick. Certain criteria can be used to qualify that the change is a fall. For example, the change in position can be required to be less than a threshold. Depending on the requirements of application, the application can determine when criteria for notification are met based on the raw or compressed sensor data.

Alternatively, according to a second arrangement, backend sensor data server 150 can determine that user A has fallen and can send a notification to mobile device B, or any other mobile device, such as mobile device C 130.

In a second arrangement, mobile device C 130 can receive processed sensor data from the backend sensor data server 150. For example, mobile device C 130 can subscribe to the processed sensor data (e.g., activities) of mobile device A. The sensor data can be processed by the backend sensor data server 150, and the processed sensor data can be transmitted to mobile device C 130. In some instances, the backend sensor data server 150 can determine and transmit information corresponding to the motion state and functional state of mobile device A 110.

In another notification example, the backend sensor data server 150 can determine that mobile device A is inside a moving vehicle (e.g., motion state). When the backend sensor data server 150 determines that mobile device A 110 is being used for texting (i.e., functional state), 10 the backend sensor data server 150 can send a notification (e.g., via text message) to mobile device C 130 that user A is texting while driving. The texting while driving determination can be based on user A typing text on mobile device A when mobile device A is in a moving vehicle. In some instances, the server can determine that user A is actually driving the vehicle based on mobile device A being linked to the Bluetooth device of the vehicle owned by user A. In other instances, when user A is sitting as a passenger in another person's vehicle, the Bluetooth devices will not be linked, and notification may not be necessary. Other methods of determining that user A is texting while driving can also be made based on the received sensor data. Various conditions for notification can be used for a notification to be generated by the server or another mobile device.

Alternatively, according to the first arrangement, mobile device B 120 can receive the unprocessed sensor data from the backend sensor data server 150, and mobile device B 120 can process the received data to determine that user A is texting while driving.

In a third arrangement, mobile device A 110 can transmit the sensor data directly to mobile device D 140 (e.g., using Apple AirDrop™). For example, by using wireless technologies (e.g., Wi-Fi, Bluetooth), mobile device A 110 can transmit sensor data to mobile device D 140. As a result, the sensor data may not be required to be transmitted through network 160. As previously mentioned, a handshake between mobile device A 110 and mobile device D 140 can be required before mobile device D 140 can subscribe to the sensor data from mobile device A 110. For example, a person can be practicing their golf swing and may want to stream (e.g., via Bluetooth technology) the sensor data to a nearby device for processing. The nearby device (e.g., IPad™) can be used to show statistics and illustrate the user's golf swing. According to some embodiments, the third arrangement can be utilized for any purposes (e.g., notification purpose, multiplayer gaming purpose) when the mobile devices are close to each other. The multiplayer gaming example is discussed in further detail in the fifth arrangement.

In a fourth arrangement, the backend sensor data server 150 can transmit processed data (e.g., timeline of activities) back to the user of mobile device A. For example, mobile device A 110 can upload its sensor data to backend sensor data server 150. The backend sensor data server 150 can process the received sensor data and transmit the processed data (e.g., timeline, daily activity report) back to mobile device A 110.

The fourth arrangement can be utilized in the timeline example. A timeline example can include mobile device A 110 replaying a timeline (e.g., hourly, daily, weekly) corresponding to the activities of user A based on the received processed data.

In a fifth arrangement, multiple mobile devices can upload sensor data to backend sensor data server 150, and the multiple mobile devices can receive processed sensor data from backend sensor data server 150. The fifth arrangement can be utilized in a multiplayer gaming example. A multiplayer gaming example can include a virtual Olympic game. In a virtual Olympic game, users can set up a challenge on how high each user can jump, then participate in the virtual Olympic game by uploading their raw sensor data after a real jump. The backend sensor data server 150 can aggregate and evaluate the sensor data, and transmit the processed data (e.g., statistics associated with the game) to the mobile devices participating in the game. The mobile devices can display avatars to simulate each jump based on the received processed data. For example, based on the user's handgrip of the mobile device, the sensor data can recreate the movement of the jump, the height of the jump, and the path of your arm motions.

Figure 5:
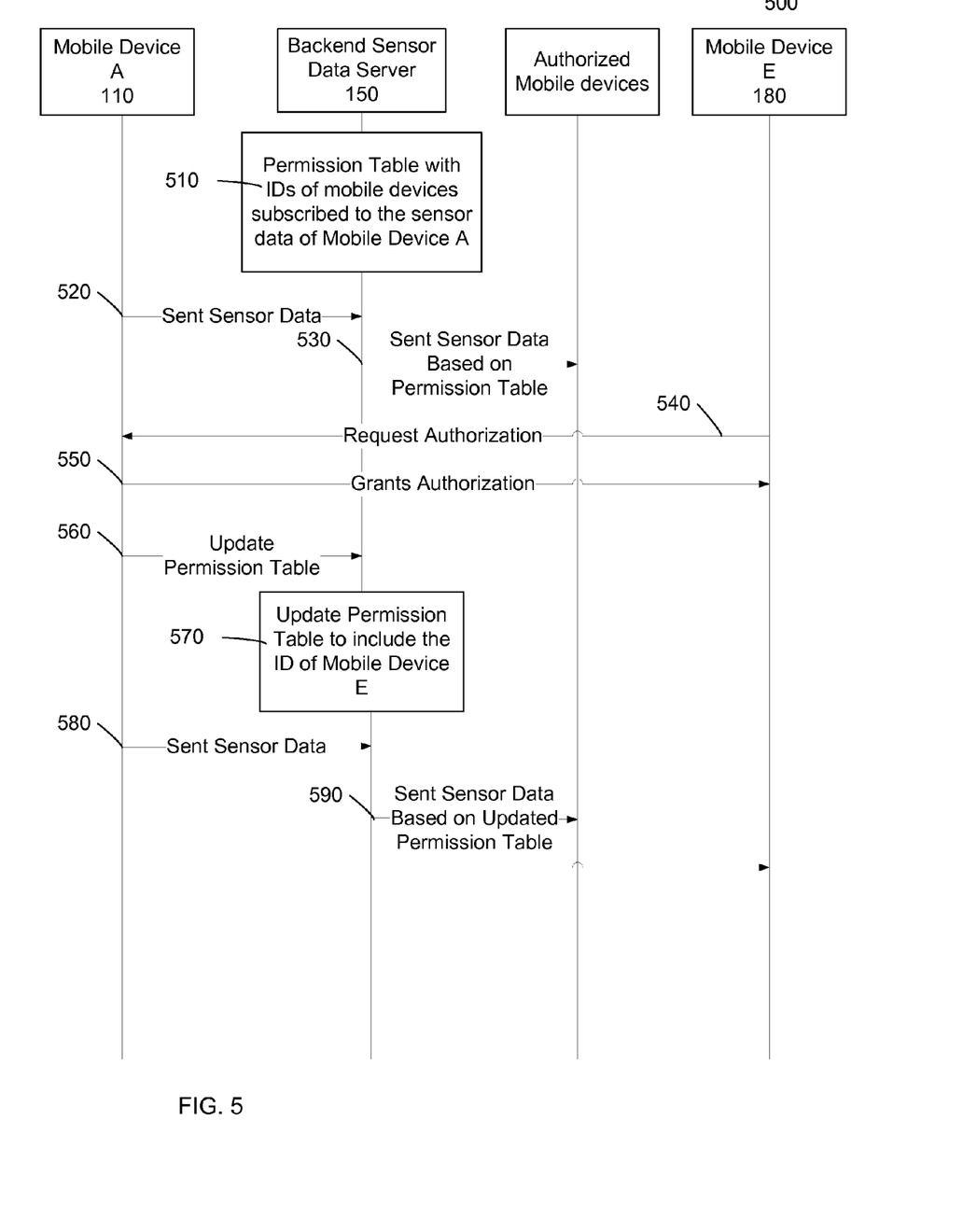
FIG. 5 is a diagram 500 for using and updating the permission table, according to embodiments of the present invention.

FIG. 1 also includes mobile device E 180, which can be used in updating the permission table example described in FIG. 5.

B. Method for Subscribing to the Sensor Data of a Mobile Device

Figure 2:
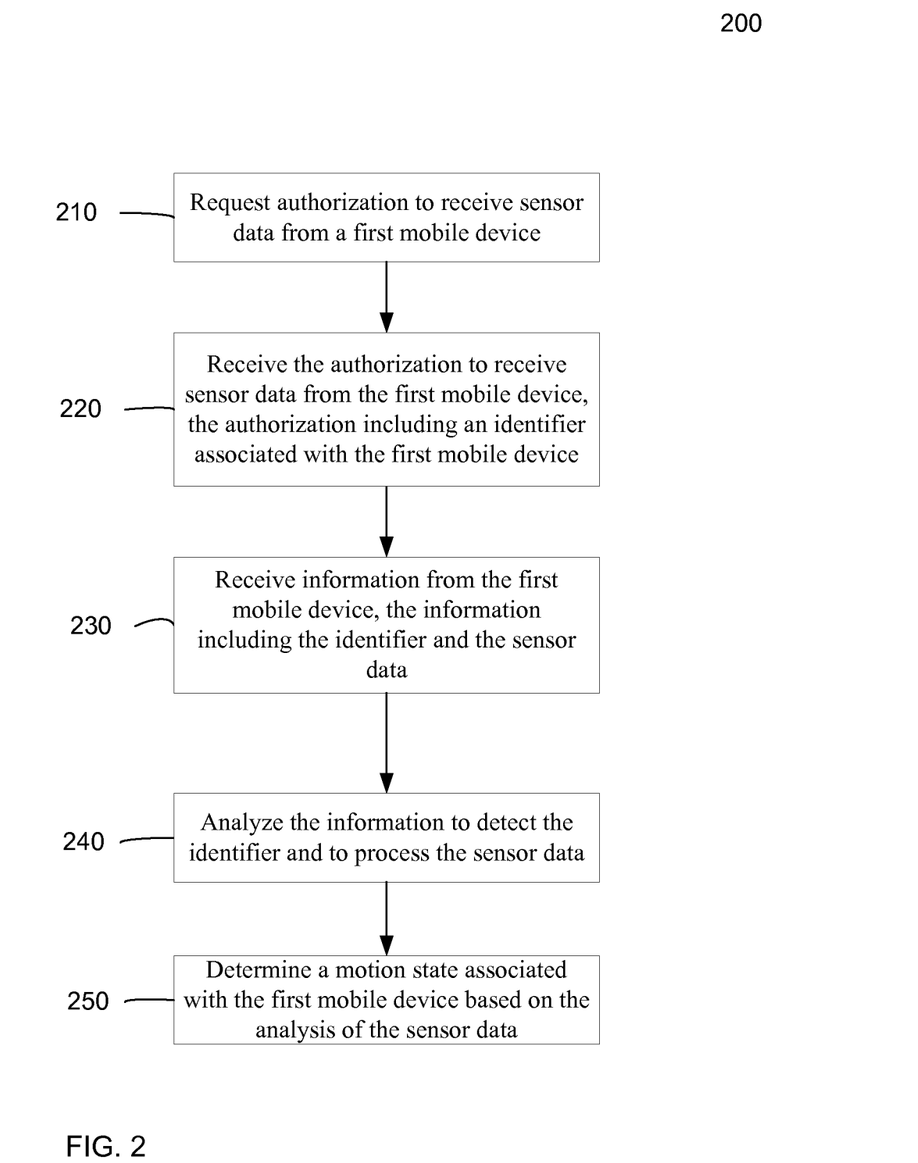
FIG. 2 is a flowchart illustrating a method 200 for subscribing to the sensor data of a mobile device, according to embodiments of the present invention.

FIG. 2 is a flowchart illustrating a method 200 for subscribing to the sensor data of a mobile device according to embodiments of the present invention. Method 200 (as well as other methods described herein) may be performed entirely or partially by a computer system, e.g., by a mobile device of the user and/or a server in communication with the mobile device.

At block 210, the computing device (e.g., a mobile device or a server) can request authorization to receive sensor data from a first mobile device (e.g., mobile device A). The authorization request can be performed in various ways, such as a handshake between mobile device A 110 and mobile device B 120. Alternatively, the authorization request can be sent by the backend sensor data server 150 on behalf of mobile device 120. In some instances, the backend sensor data server 150 can use a permission table 170 to determine the authorized mobile device(s).

At block 220, the computing device can receive the authorization to receive sensor data from the first mobile device. The authorization can include an identifier associated with the mobile device. In the handshake example, as further described in FIG. 3, the authorization can be complete once the computing device receives the authorization. In the permission table example, as further described in FIG. 4 and FIG. 5, the backend server can update the permission table to include the computing device in the list of authorized devices associated with the identifier. In some instances, the permission table can include different levels of access rights (e.g., full access, restricted access) for each authorized computing device.

According to one embodiment, the server 150 can receive the authorization to receive sensor data from the first mobile device without initially requesting authorization. For example, a user of the first mobile device may set up the settings of the mobile device to grant authorization for a downloaded application to have access to the sensor data. In this example, the server associated with the downloaded application may not have initially request authorization, before the user granted the authorization.

According to another embodiment, when a computing device receives sensor data, the computing device can automatically infer that an authorization to receive sensor data has been granted. For example, when a computing device requests authorization, the first mobile device can start sending sensor data without first sending an authorization grant.

The identifier can uniquely identify the first mobile device. Examples of identifier can include the phone number, unique device identifiers, International Mobile Station Equipment Identity (IMEI), or network address associated with the first mobile device. In some embodiments, the first mobile device can transmit the identifier along with the authorization grant. In other embodiments, the identifier can be generated by the receiving computing device (e.g., backend sensor data server 150) based on the received authorization grant. For example, when the authorization grant is received via the Internet, the network address can be derived from the received Internet protocol (IP) packets. Alternatively, when the authorization grant is received via a short message service (SMS) message, the phone number can be derived from the received SMS message.

At block 230, the authorized computing device can receive information from the first mobile device. The information includes the identifier and the sensor data. The sensor data can be derived from one or more sensors in first mobile device, such as, but not limited to, accelerometers, gyroscopes, compasses, pedometers, pressure sensors, audio sensors, light sensors, barometers, cameras, GPS units and wireless circuitry. In some instances, the one or more sensors can include a motion sensor (e.g., accelerometer) and the sensor data can include motion data from the motion sensor.

At block 240, the computing device can analyze the information to detect the identifier and to process the sensor data. An example of analysis can include the decompression of the received information to obtain the raw sensor data. Another example of analysis can include decrypting the received information to detect the identifier associated with the first mobile device.

At block 250, the computing device can determine a motion state associated with the first mobile device based on the analysis of the sensor data. The motion state can include a stationary state, a walking state, a running state, and a driving state. Further details can be found in U.S. patent application Ser. No. 12/153,361, titled "ACTIVITY DETECTION," filed Jun. 3, 2011, and U.S. patent application Ser. No. 14/065,224, titled "DETERMINING EXIT FROM A VEHICLE," filed Oct. 28, 2013, which are incorporated by reference.

Figure 3:
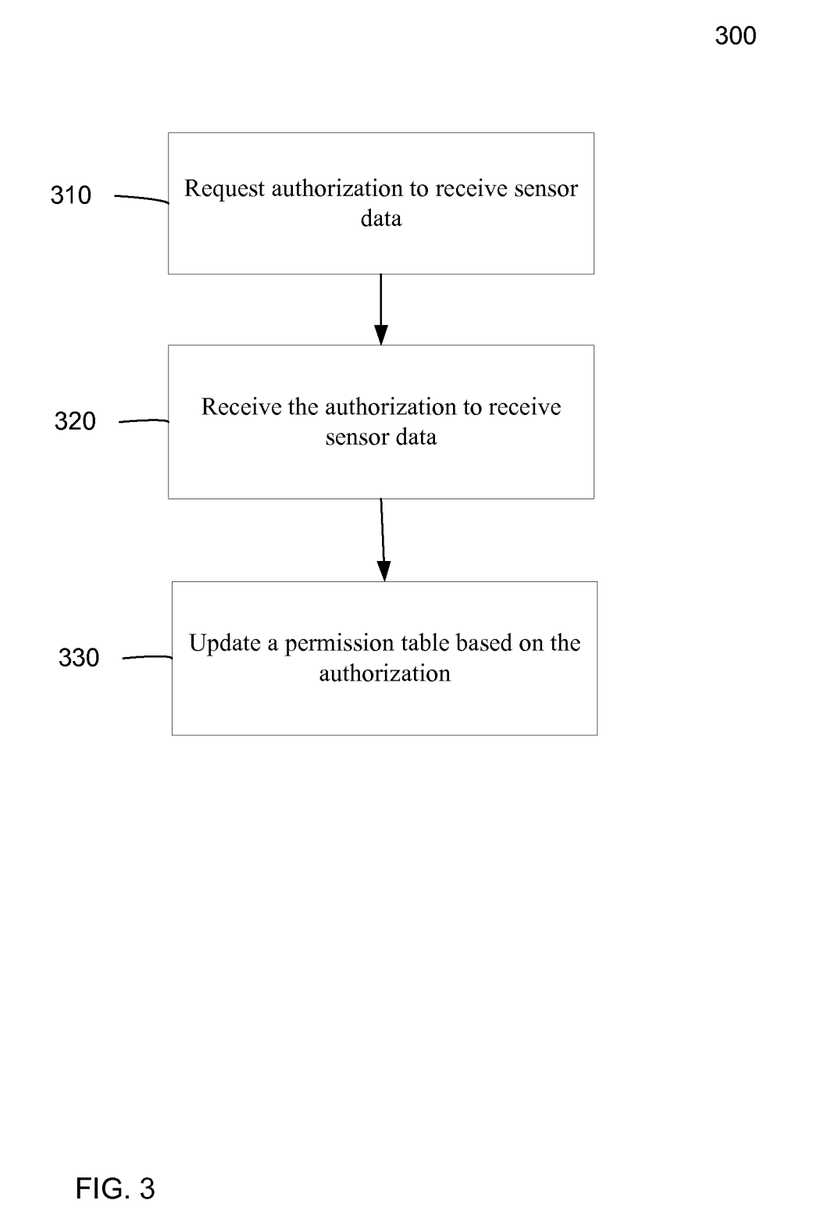
FIG. 3 is a flowchart illustrating a method 300 for authorizing the subscription of the sensor data, according to embodiments of the present invention.

Additionally, the computing device can determine a functional state based on the motion state and the received sensor data. The functional state includes a plurality of activities associated with each motion state. For example, functional state classification can be associated with each motion state (e.g., driving, walking) by further describing each motion state (e.g., walking on rough terrain, driving while texting). As previously discussed in FIG. 1, examples of functional state classification can include: determining that the user has fallen while walking; determining that the user is texting while driving; determining the height of a user's jump while walking or running II. Authorization Techniques A. Authorization Technique using a Handshake FIG. 3 is a flowchart illustrating a method 300 for authorizing the subscription of the sensor data, according to embodiments of the present invention. An example of an authorization technique is a handshake. The handshake for authorizing the subscription of sensor data from a first mobile device can be performed between the first mobile device and a server, the first mobile device and a second mobile device, or a server and a second mobile device.

At block 310, the computing device can request to receive sensor data from the first mobile device. The request may only happen once. Once the authorization is established, the first mobile device can push sensor data to the second mobile device without future requests.

In one embodiment, the first mobile device can initiate a process that results in the authorization. But, a request from the computing device can still occur. For example, a user can use the graphical user interface on the first mobile device to setup a configuration that allows the sensor data from the first mobile device to be transmitted to another computing device. In this example, a user may want its sensor data to be uploaded to a server (e.g., website). In some instances, the first mobile device can give an umbrella permission to the server, where the umbrella permission allows any other users to receive the sensor data. When the user sets up the configuration, a message can be sent to the computing device (e.g., a server or another mobile device). The message can be an initial signal to begin communication, and may include a purpose for the communication (e.g., to set up a subscription for sensor data to be sent). The computing device can check whether it desires to receive the sensor data, e.g., by accessing functionality or settings, or prompting a user, at the computing device. Once the computing device responds to indicate that a communication sessions has begun (such a response by the computing device can be the request), the first mobile device can send an identifier and other data (e.g., a recognizable authorization command) to the computing device.

In the first and second arrangements described in FIG. 1, mobile device B 120 and mobile device C 130 can submit their request to either the backend sensor data server 150 or mobile device A 110. In the third arrangement described in FIG. 1, mobile device D 140 can submit the request to mobile device A 110. In the fourth arrangement described in FIG. 1, mobile device A 110 does not need to submit a request when it is receiving a timeline generated from its own sensor data. In the fifth arrangement described in FIG. 1, all the mobile devices participating in the multiplayer gaming example can submit the request to the backend sensor data server 150.

At block 320, the computing device can receive the authorization to receive sensor data from the first mobile device. For example, the first mobile device can sent to the computing device a notification that the computing device is authorized to receive the sensor data from the first mobile device. After receiving the notification, the computing device can tag the first mobile device with a corresponding identifier. The identifier can be used to associate the received sensor data with the first mobile device. In some instances, the sensor data may be encrypted, therefore the authorization grant may include an encryption key, in order for the computing device to be able to decrypt the sensor data. In the first, second and fifth arrangements described in FIG. 1, the mobile devices can receive the authorization from the backend sensor data server 150 based on the permission table 170. Alternatively, in the third arrangement described in FIG. 1, mobile device D 140 can receive the authorization from mobile device A 110.

According to another embodiment, when the computing device receives sensor data without an implicit authorization grant from the first mobile device, the computing device may infer that the authorization has been granted.

Optionally, at block 330, a permission table can be updated, based on the authorization. As it will be further described in FIG. 5, mobile device A 110 can update the permission table 170 when a new computing device has been authorized to receive its sensor data. For example, after a new mobile device is authorized to receive sensor data, the identifier(s) associated with the transmitting and receiving mobile devices can be stored in a permission table 170.

Below is an example of a permission table, according to some embodiments.

TABLE 1

Permission Table for Sensor Data from Mobile Device A

|  | Mobile Device B | Mobile Device C | Mobile Device D | Mobile Device E |
|---|---|---|---|---|
| Access Rights | All Sensor Data | Restricted to Accelerometer Data Only | Restricted to Location Information | None |
| Duration of Access | Unlimited | 24 Hours | 1 Hour | None |
| Communication Type | All | Bluetooth Only | Wi-Fi Only | None |

As illustrated in Table 1, a permission table can include a plurality of information about each mobile device. For example, the permission table can store access rights, duration of access, and communication type for each mobile device. Access rights can include the type of sensor data a mobile device is allowed to receive. Duration of access can include the duration of time that the receiving mobile device is authorized to access the sensor data. Communication type can include the method to transmit the sensor data to the receiving mobile device.

B. Authorization Technique using a Permission Table

Figure 4:
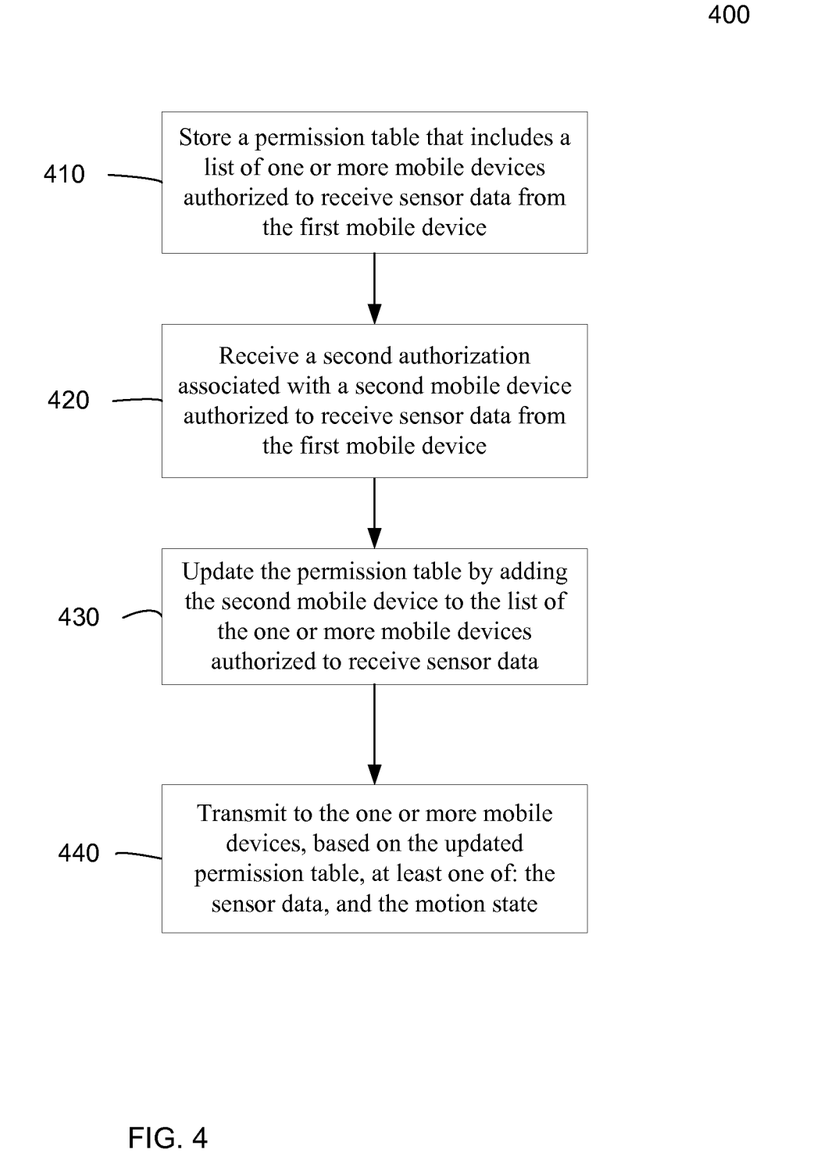
FIG. 4 is a flowchart illustrating a method 400 for authorizing the subscription of the sensor using a permission table, according to embodiments of the present invention.

FIG. 4 is a flowchart illustrating a method 400 for authorizing the subscription of the sensor using a permission table according to embodiments of the present invention. As illustrated in FIG. 4, using a permission table can be another example of an authorization technique. For example, after a server has received the sensor data from a first mobile device, the server can transmit the sensor data to other mobile device(s) using a permission table. A permission table can allow for a centralized location to store sensor data access information.

At block 410, the backend sensor data server 150 can store a permission table 170 that includes a list of one or more mobile devices (e.g., mobile device B 120, mobile device C 130, mobile device D 140) authorized to receive sensor data from the first mobile device (e.g., mobile device A 110). In one implementation the permission table can be stored in memory which is connected to the backend sensor data server 150 via network 160. Thus, the backend sensor data server 150 can include memory devices connected over a network.

At block 420, the backend sensor data server 150 can receive a second authorization from the first mobile device. The second authorization can be associated with a second mobile device authorized to receive sensor data from the first mobile device. For example, in the first authorization, mobile device A 110 can send an authorization for mobile device B 120 to backend sensor data server 150. In the second authorization, mobile device A 110 can then send another authorization for mobile device C 130 to backend sensor data server 150. The second authorization can be based on a handshake as previously described at blocks 310 and 320.

At block 430, the backend sensor data server 150 can update the permission table 170 by adding the second mobile device to the list of the one or more mobile devices authorized to receive sensor data. Continuing with the example from block 420, after receiving the second authorization, backend sensor data server 150 can add another row to the permission table 170 with access information corresponding to mobile device C 130.

Alternatively, the user of the first mobile device can restrict and/or remove the subscription rights of an authorized mobile device. When the backend sensor data server 150 receives such an update from the first mobile device, the backend sensor data server 150 updates the permission table 170 by restricting or removing the subscription rights of the authorized mobile device. For example, backend sensor data server 150 can use the identifier to find and update the column in the permission table 170 associated with the mobile device that is being restricted or removed.

At block 440, the backend server can transmit to the one or more mobile devices, based on the updated permission table, the sensor data and/or the motion state. As examples, the sensor data can be sent to server 150 periodically or upon command (e.g., in response to input from a user). In another implementation, the functional state associated with the motion state is also transmitted to the one or more mobile devices, based on the updated permission table.

C. Updating the Permission Table

FIG. 5 is a diagram 500 for using and updating the permission table, according to embodiments of the present invention. In this example, a permission table for access information to sensor data from mobile device A is updated when mobile device E 180 requests access to the sensor data.

At block 510, backend sensor data server 150 can store a permission table 170 with identifier(s) of mobile device(s) subscribed to the sensor data of mobile device A 110. As illustrated in FIGS. 3-4, when a mobile device is authorized to subscribe to the sensor data of mobile device A 110, the identifier of the authorized mobile device can be stored in the permission table 170.

At 520, mobile device A 100 can transmit sensor data to backend sensor data server 150. The sensor data can be transmitted with an identifier so that backend sensor data server 150 can associate the sensor data with mobile device A 100. The first and second arrangements of FIG. 1 can be examples of the type of transmission that occurs at 520.

At 530, backend sensor data server 150 can transmit the received sensor data to the authorized mobile devices based on the permission table from block 510. For example, backend sensor data server 150 and access the permission table 170, and use the identifier to identify the other devices to transmit the sensor data from mobile device A 110.

According to some embodiments, the permission table 170 can include a list of authorized mobile devices with different levels of authorization rights. Therefore, based on the permission table 170, backend sensor data server 150 can determine to send raw sensor data, compressed sensor data, motion state classification, and/or functional state classification to each authorized mobile device. For example, in the first arrangement of FIG. 1, backend sensor data server 150 sends sensor data (e.g., raw, compressed) to mobile device B 120, while in the second arrangement of FIG. 1, backend sensor data server 150 sends processed sensor data (e.g., motion state, functional state) to mobile device C 130.

In a new process flow, at 540, mobile device E 180 can request authorization to receive sensor data from mobile device A 110. For example, user of mobile device E 180 can identify mobile device A via a phone number, and using the phone number send an SMS message to request authorization.

At 550, mobile device A 110 can grant mobile device E 180 authorization to receiver sensor data from mobile device A 110. As previously discussed, FIG. 3 describes methods for authorizing the subscription of sensor data, using a handshake, according to embodiments of the present invention.

At 560, mobile device A 110 sends an update to the permission table 170. The update can include the identifier associated with mobile device E 180 and the level of authorization rights. The level of authorization rights describes the type of sensor data from mobile device A 110 that mobile device E 180 is authorized to access. Additionally, the level of authorization rights includes different levels of access rights (e.g., full access, restricted access, access to data from one specific sensor, no access).

At 570, backend sensor data server can update the permission table 170 to include the identification of mobile device E 180 and the level of authorization rights. In another embodiment, mobile device A 110 can directly update the permission table 170.

According to some embodiments, the sensor data can be transmitted periodically (e.g., every minute). During the second transmission of sensor data from mobile device A 110, at 580, mobile device A 100 can transmit sensor data to backend sensor data server 150. Step at 580 is similar to the step at 520.

After backend sensor data server 150 receives the sensor data from mobile device A 100, at 590, backend sensor data server 150 can transmit the received sensor data to the authorized mobile devices, based on the updated permission table 170 from block 560. Since the permission table has been updated, backend sensor data server 150 also sends the sensor data to mobile device E 180.

III. Transmission Techniques

A. Transmitting Compressed Data to another Computing Device

Figure 6:
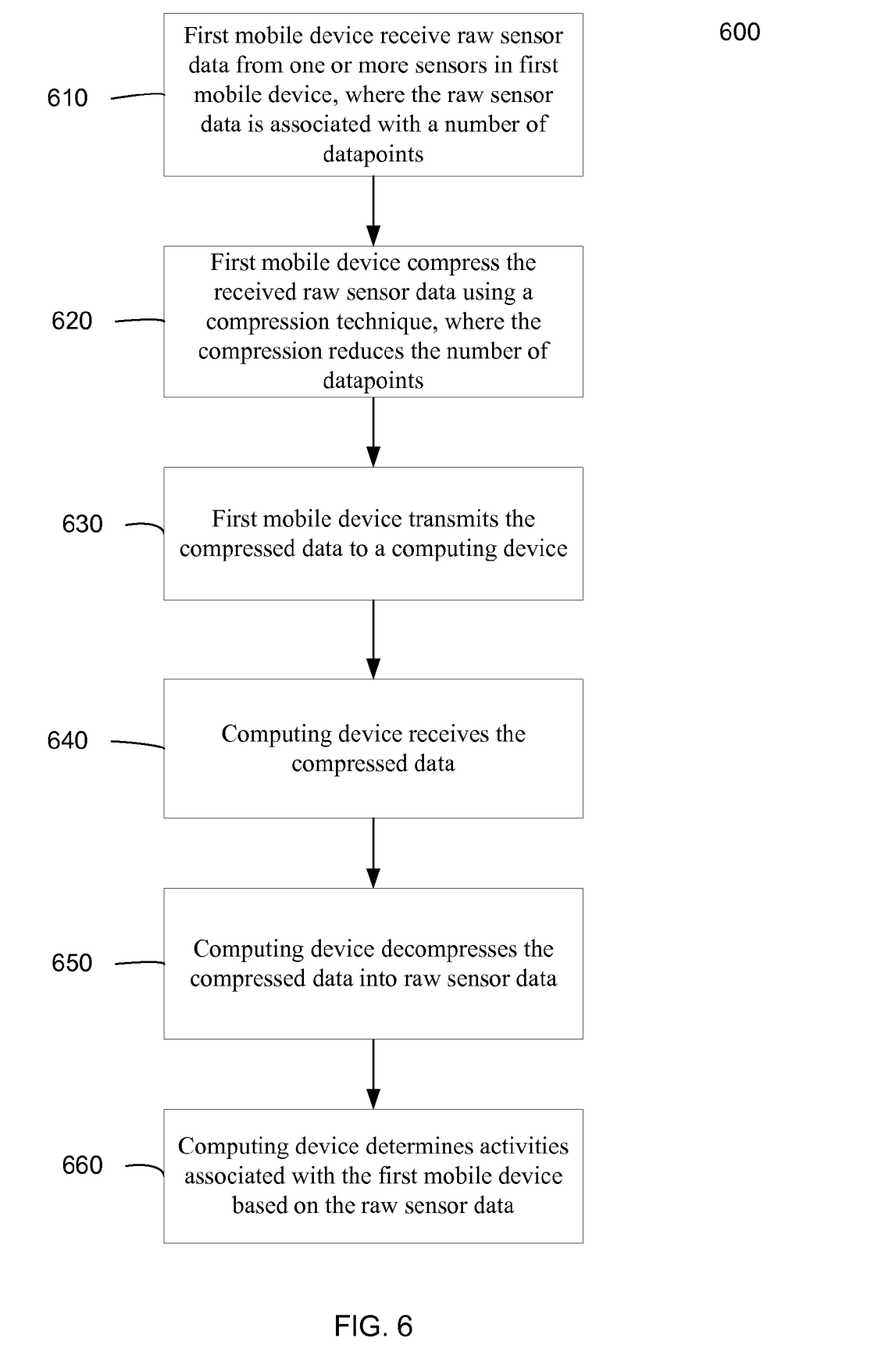
FIG. 6 is a flowchart illustrating a method 600 for compressing the sensor data, according to embodiments of the present invention.

FIG. 6 is a flowchart illustrating a method 600 for transmitting the sensor data using a compression method, according to embodiments of the present invention. In this example, a first mobile device can compress the sensor data, and transmit the compressed sensor to a computing device (e.g., server, a second mobile device). The computing device can decompress the received compressed data to determine activities associated with the first mobile device.

At block 610, mobile device A 110 can receive raw sensor data from one or more sensors. As previously mentioned, the one or more sensors can be sensors integrated in the mobile device. The sensors can include an accelerometer, gyroscope, compass, pedometer, pressure sensors, audio sensors, light sensors, barometers, camera, GPS unit and wireless circuitry. The raw sensor data can be associated with a number of datapoints. In some instances, a datapoint can include a data value for each sensor at a specific time value. The time value can correspond to a timestamp for each data value. The change in the time value between different datapoints can be based on a time interval. The time interval can be dependent on the sampling frequency of each sensor. For example, if the sampling frequency of the accelerometer is two Hertz, then the raw sensor data includes two data values per second for the accelerometer. In this example, the accelerometer can output a data value at every half-second interval, and the time value is incremented by half-second for every datapoint.

At block 620, mobile device A 110 can compress the received raw sensor data using a compression technique. The compression reduces the number of datapoints. In one or more arrangements, the compression technique (e.g., algorithm) can be stored in the computer-readable medium of mobile device A 110. Additionally, the processor of mobile device A 110 can compress the raw sensor data using the compression technique.

An example of a compression technique can include identifying similar raw sensor data in consecutive timeframes, and transmitting those similar raw sensor data as a single data value with its associated time duration. When the datapoints are similar during a specific time duration, then the compression technique can include using a single data value for the specific time duration. For example, if a mobile device is stationary on a table from $t_1$ to $t_2$, then the compressed file can simply be a single raw data value and the specific time duration (e.g., from $t_1$ to $t_2$), rather than raw data values associated with each timeframe for the entire duration.

Another example of a compression technique is to sample the raw data for each sensor in the mobile device at a different frequency. For example, the accelerometer can be sampled at 60 Hz, while the gyroscope can be sampled at 120 Hz. The mobile device can determine the sampling frequency based on algorithms. The algorithms can be based on previous usage data and/or known optimum sampling frequency for each sensor. Alternatively, the user can input the sampling frequency, using a graphical user interface.

An example of a compression technique can include separating the datapoints into a specific number of time intervals, and wherein the datapoints associated with each time interval is averaged. For example, the time interval can be one second, and the compression technique can be to average the value of the data points for each one second window.

Another example of a compression technique can include using a dependency relationship between the one or more sensors to filter out datapoints not relevant in determining the activities associated with the first mobile device. For example, an accelerometer and a pedometer have a dependency relationship, because when a user is stationary, then the user is not walking. Therefore, when the datapoints associated with the accelerometer have a value of zero, then the mobile device is stationary. By knowing that the mobile device is stationary, the compression technique can filter out datapoints from the pedometer, because the user of the mobile device is not walking.

Another example of a compression technique can include keeping a datapoint that varies above a specific threshold in relations to a previous data point. For example, only a datapoint that changes from the previous datapoint is kept. By only keeping the datapoints that are constantly changing, then the compression technique removes datapoints that are constant over specific time duration. In some intances, the datapoints that are constant over a specific time duration are not relevant in determining the activities associated with the first mobile device. Furthermore, other compression techniques that are known in the art can be used to compress the raw sensor data.

At 630, mobile device A 110 can transmit information to a computing device (e.g., backend sensor data server 150, mobile device D 140). In some instances, the information can include the compressed sensor data and the compression technique. Different arrangements for transmitting the compressed data have been previously described in FIG. 1.

In another process flow, at 640, the computing device can receive the compressed data. Depending on the different arrangements, the compressed data can be transmitted and received using the wireless circuitry. The wireless circuitry is further described in FIG. 9.

At 650, optionally, the computing device can decompress the compressed data into raw sensor data. According to some embodiments, the computing device can determine activities associated with the first mobile device based on the compressed sensor data. For example, the compressed sensor data may be at a lower sampling frequency than the raw sensor data, but the lower sampling frequency may be sufficient for the computing device to determine the activities associated with the first mobile device. If the sensor data is compressed, the decompression technique can be based on the compression technique used in block 620.

In some instances, if the compressed sensor data contains sufficient information, then the decompression technique can reconstruct the raw sensor data. In the example when the datapoints are similar during a specific time duration (e.g., when the mobile device is laying on a table over a specific time duration), the compression technique can be to use a single data value for the specific time duration. By using a single data value for the specific time duration, the compression technique can filter out all the similar datapoints in the specific time duration. The raw sensor data can have similar sensor value with an incremental time value due to the sensor outputting a sensor value at a specific time interval. The specific time interval can be based on the sampling frequency of the sensor. In this example, the decompression can reconstruct the raw sensor data by recreating the datapoints that have been filtered out for the specific time duration. A datapoint can be recreated for one or more time value that has been filtered out because the time value is incremented by a constant value based on the sampling frequency. The recreated datapoints can have a sensor value that is equal to the received single data value for each time value.

In some instances, the computing device may not be able to reconstruct the raw sensor data, based on the received compressed sensor data. For example, if the compression technique is to average a plurality of sensor values over a specific time interval window into an average sensor value, then the decompression may not be able to reconstruct all of the datapoints in that specific time interval window based on the average sensor value. In this example, the actual sensor value for the datapoints that have been filtered out may not be reconstructed from the average sensor value of the specific time interval window. However, as previously mentioned, the computing device may determine the activities of the first mobile device based on the compressed sensor data. For example, when the mobile device falls (e.g., due to a person falling on the ground), the sensor value outputted by the accelerometer is high in relations to sensor values when a user is not falling (e.g., walking) During the compression, the average sensor value over that specific time interval window can be higher than the determined threshold for the computing device to trigger a notification that the user of the first mobile device has fallen.

At block 660, the computing device can determine activities associated with the first mobile device based on the sensor data, which can be the compressed sensor data or the reconstructed sensor data. As previously mentioned, the determined activities can be similar to the motion state and functional state described in block 250.

Diagram for Sharing the Sensor Data Using a Server

Figure 7:
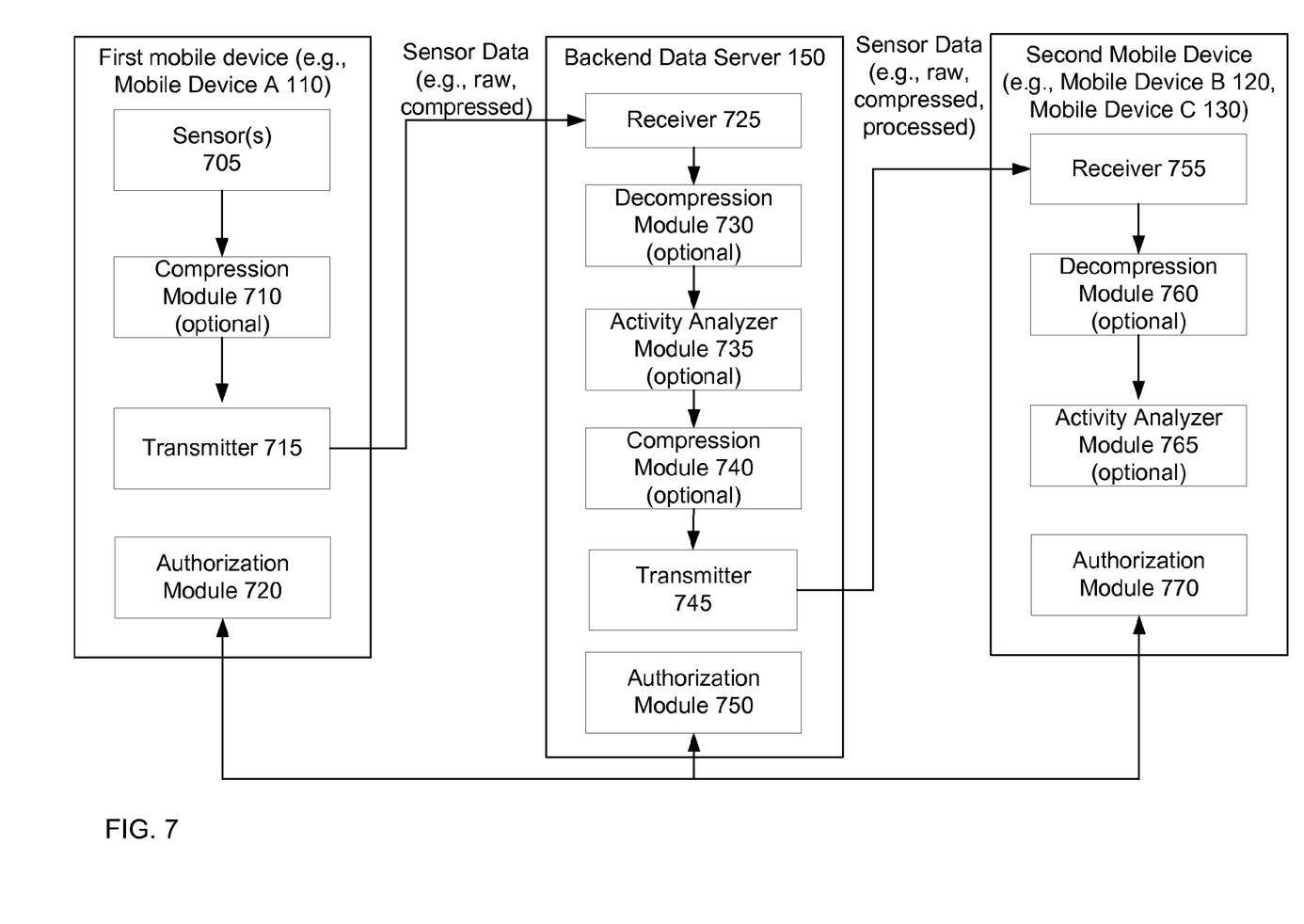
FIG. 7 is a diagram 700 for sharing the sensor data, according to embodiments of the present invention.

FIG. 7 is a diagram 700 for sharing the sensor data according to embodiments of the present invention. In this example, a server can receive sensor data from a first mobile device. Depending on the arrangement, the server can use a decompression module, an activity analyzer module, and/or a compression module to manipulate the received sensor data before transmitting the manipulated data to a second mobile device.

As described in FIG. 6, a first mobile device (e.g., mobile device A 110) can use a compression module 710 to compress the received sensor data from sensor(s) 705, and transmit the compressed data to a backend sensor data server 150. Alternatively, mobile device A 100 can transmit the received sensor data from sensor(s) 705, using transmitter 715, without compressing the received sensor data.

Backend sensor data server 150 can use a receiver 725 to receive the transmitted sensor data (e.g., compressed sensor data, raw sensor data). If the transmitted sensor data is compressed, backend sensor data server 150 can use a decompression module 730 to determine the raw sensor data from the compressed sensor data.

Figure 8:
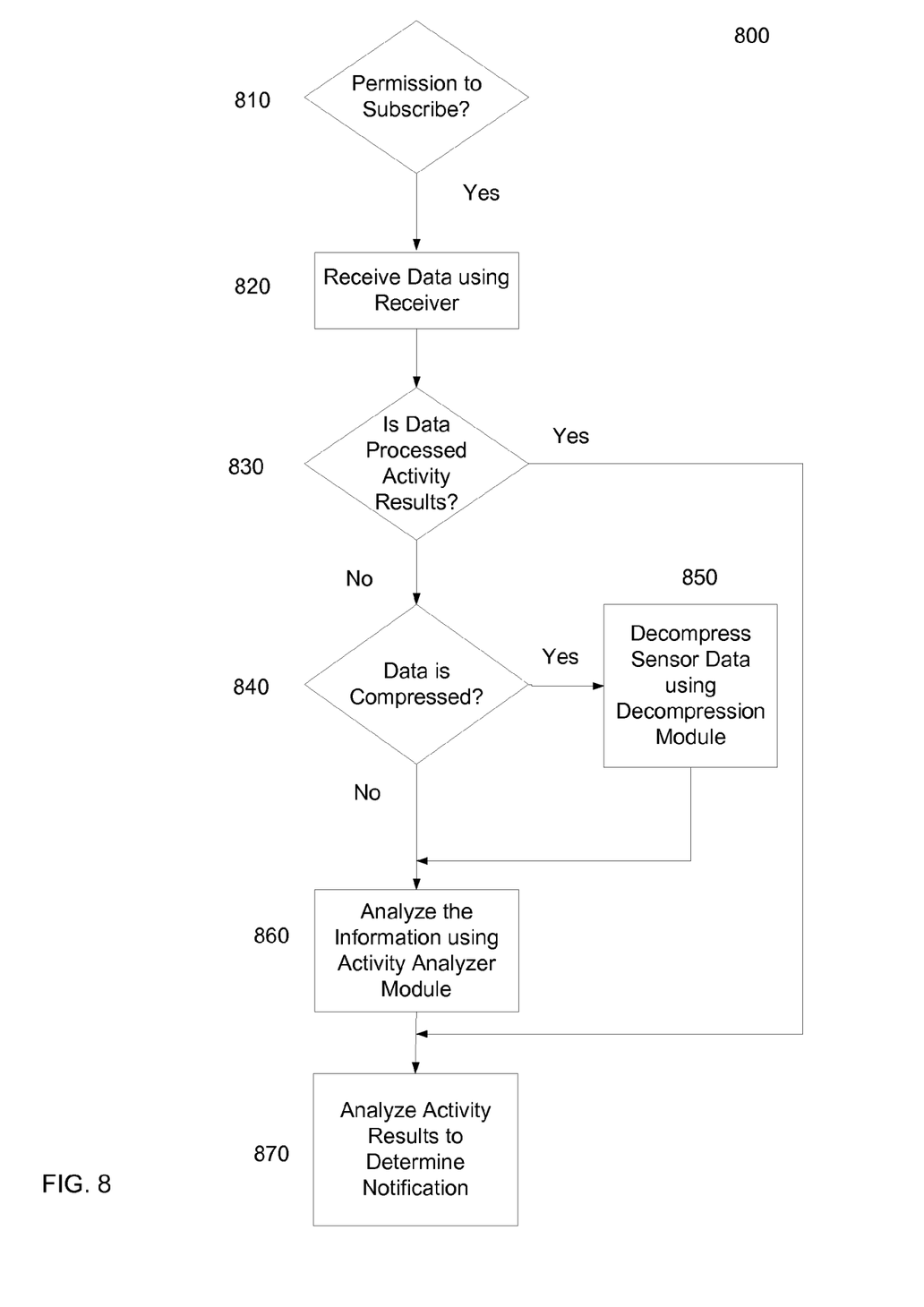
FIG. 8 is a flowchart of method 800 for determining the activities associated with the sensor data, according to embodiments of the present invention.

Using an activity analyzer module 735, backend sensor data server 150 can determine the activities (e.g., motion state, functional state) based on the raw sensor data. FIG. 8 further describes the determination of activities, based on the sensor data.

After backend sensor data server 150 has received the sensor data from mobile device A 110, using receiver 725, backend sensor data server 150 can transmit the received data to a second mobile device (e.g., mobile device B 120, mobile device C 130). Additionally, compression module 740 can be used to compress raw sensor data before transmitting the sensor data to another module.

Depending on the different arrangements discussed in FIG. 1, backend sensor data server 150 can transmit either raw, compressed and/or processed sensor data using transmitter 745. In one example, backend sensor data server 150 can use receiver 725 to receive the sensor data and transmit, using transmitter 745, without any manipulation (e.g., decompress, analyze, compress) of the sensor data. In another example, when receiver 725 receives raw sensor data, then backend sensor data server 150 can transmit compressed sensor data using transmitter 745 and compression module 740. Alternatively, backend sensor data server 150 can transmit processed sensor data using transmitter 745 and activity analyzer module 735. In yet another example, when receiver 725 receives compressed sensor data, then backend sensor data server 150 can transmit raw sensor data using transmitter 745 and decompression module 730. Alternatively, backend sensor data server 150 can transmit processed sensor data using transmitter 745, decompression module 730 and activity analyzer module 735.

After the second mobile device (e.g., mobile device B 120, mobile device C 130) has received the sensor data from backend sensor data server 150, using receiver 755, the second mobile device can use the sensor data.

The second mobile device can use a receiver 755 to receive the transmitted sensor data (e.g., processed sensor data, compressed sensor data, raw sensor data) from transmitter 745. If the transmitted sensor data is compressed, the second mobile device can use a decompression module 760 to determine the raw sensor data from the compressed sensor data. Additionally, using an activity analyzer module 765, the second mobile device can determine the activities (e.g., motion state, functional state) based on the raw sensor data. Furthermore, if the transmitted sensor data is processed, then the second mobile device can use the processed data without the need of the decompression module 760 and activity analyzer module 765.

Moreover, authorization modules 720, 750 and 770 can be used for the authorization methods described in FIG. 4.

IV. Determination of Activities

FIG. 8 is a flowchart of method 800 for a computing device to determine the activities associated with mobile device A 110 based on the received sensor data according to embodiments of the present invention. Method 800 can be performed by a server or another mobile device.

At block 810, mobile device A 110 can determined whether the computing device has been given permission to subscribe to the sensor data from mobile device A 100. In some instances, backend sensor data server 150 can use a permission table to determine whether other mobile devices have been given permission to subscribe to the sensor data. FIGS. 3 and 4 describe methods for requesting and receiving permission to subscribe to the sensor data of a mobile device.

If permission is granted, then computing device (e.g., server 150 or mobile device B 120) can receive sensor data at block 820. When a server 150 is receiving the sensor data, the server 150 can set up an account associated with mobile device A 110. The computing device can use receiver 725 or receiver 755 to receive the sensor data. Alternatively, if permission is not granted, then the method ends.

At block 830, it is determined if the received sensor data is processed activity results. If it is processed activity results, then the method goes to block 870, where the computing device uses the activity results (e.g., motional state, functional state). The second arrangement described in FIG. 1 is an example of a computing device receiving processed activity results. If the received sensor data is not processed activity results, then the method goes to decision block 840.

At block 840, it is determined if the received data is compressed. If the received data is compressed, then the computing device decompresses the received data using decompression module (e.g., decompression module 730, decompression module 760) at block 850. If the received data is not compressed, then the method goes to block 860.

At block 860, the computing device analyzes the raw sensor data using activity analyzer module (e.g., activity analyzer module 735, activity analyzer module 765). The raw sensor data is either received directly at block 820 or decompressed into raw sensor data at block 850.

At block 870, the computing device can analyze the activity results (e.g., motion state, functional state) to determine notification. For example, based on the activity results, mobile device B 120 can determine that the user of mobile device A 110 has fallen. Therefore, mobile device B 120 can display an alert to notify the user of mobile device B 120 that the user of mobile device A 110 has fallen.

V. Moble Device

Figure 9:
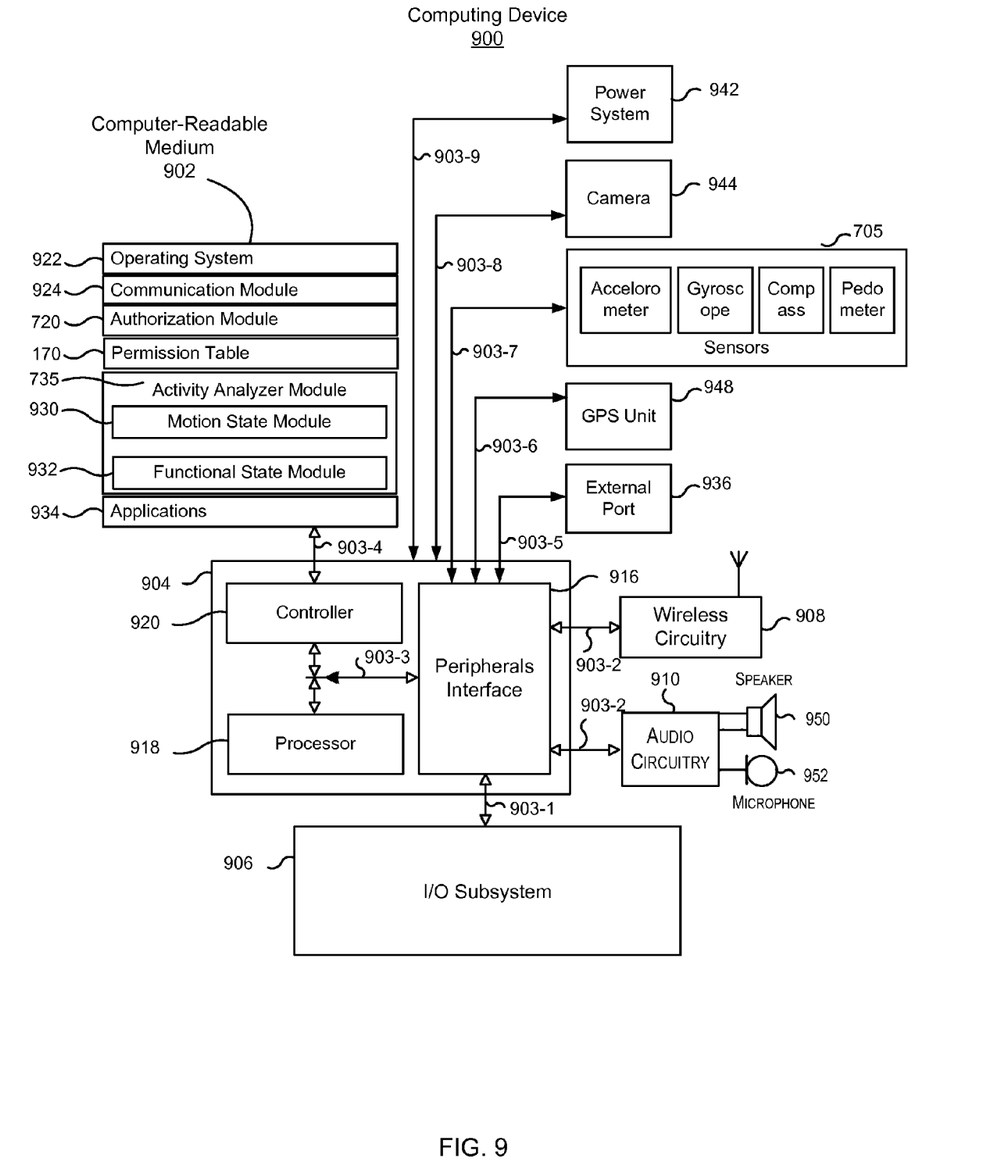
FIG. 9 is a block diagram of a portable electronic device or mobile device, according to an embodiment of the invention.

FIG. 9 is a block diagram of a portable electronic device or computing device 900 according to an embodiment of the invention. Aspects of computing device 900 also apply to a server. Computing device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Computing device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for computing device 900, and that computing device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

The short-range wireless transceiver and/or the medium-range wireless transceiver can be used in the example described in the third arrangement of FIG. 1.

The short-range wireless transceiver, medium-range wireless transceiver, and/or a long range wireless transceiver can be used in the example described in the first, second, fourth and fifth arrangements of FIG. 1.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. For example, permission table 170 can be stored in computer-readable medium. Computer-readable medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 916, one or more processors 918, and memory controller 920 can be implemented on a single chip, such as processing system 904. In some other embodiments, they can be implemented on separate chips.

Computing device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, computing device 900 includes a camera 944. In some embodiments, computing device 900 includes sensors 705. Sensors can include accelerometers, compasses, gyroscopes, pedometers, pressure sensors, audio sensors, light sensors, barometers, and the like. Sensors 705 can be used to sense location aspects, such as auditory or light signatures of a location.

In some embodiments, computing device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for computing device 900. In some embodiments, the software components include an operating system 922, a communication module (or set of instructions) 924, an authorization module (or set of instructions) 720, an activity analyzer module (or set of instructions) 735, a motion state module (or set of instructions) 930, a functional state module (or set of instructions) 932, and other applications (or set of instructions) 934, such as a multiplayer gaming application.

Operating system 22 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 30-pin connector, etc.) is adapted for coupling directly to other devices or indirectly over a network (e.g., the Internet, wireless LAN, etc.).

In some embodiments, authorization module 720 can assist in authorizing other mobile devices to receiver sensor data from a first mobile device. In some embodiments, permission table 170 can be used by authorization module 720 to determine which mobile devices to authorize. In some embodiments, activity analyzer module can use motion state module 930 to determine the motion state classification. Additionally, activity analyzer module can use functional state module 932 to determine a functional state classification for the determined motion state.

The one or more application programs 934 on the mobile device can include any applications installed on the computing device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, computing device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages to certain embodiments of the invention include reducing the processing burden on the first mobile device. This can be done by allowing the first mobile device to transmit raw or compressed data, and using a server to process the data. This improves battery power duration and improves the processing speed of the first mobile device.

Further advantages to certain embodiments of the invention include increasing the type of applications that can use the raw sensor data. Some embodiments of the invention permit the server to process complicated algorithms which may not be possible on a mobile device. For example, by using a server to process the raw sensor data, applications for multiplayer games can increase.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method for sharing sensor data, the method comprising:
   receiving, at a computing device, an authorization to receive sensor data from a first mobile device, the authorization including an identifier associated with the first mobile device;
   receiving, at the computing device, information from the first mobile device, the information including the identifier and compressed sensor data from the first mobile device, wherein the compressed sensor data is derived from raw sensor data from one or more sensors in the first mobile device, the one or more sensors including at least one motion sensor and the raw sensor data including motion data from the at least one motion sensor;
   analyzing, with the computing device, the information to detect the identifier and to decompress the compressed sensor data to obtain the raw sensor data; and
   determining, by the computing device, a motion state of the first mobile device and a functional state associated with the motion state based on an analysis of the raw sensor data.

2. The method of claim 1, wherein the functional state corresponds to one of a plurality of activities associated with the motion state.

3. The method of claim 1, further comprising:
   requesting, by the computing device, the authorization to receive the sensor data from the first mobile device.

4. The method of claim 1, wherein the motion state includes a stationary state, a walking state, a running state, or a driving state.

5. The method of claim 1, wherein the compressed sensor data is unprocessed sensor data that is derived from the raw sensor data.

6. The method of claim 1, wherein the computing device is a server.

7. The method of claim 6, further comprising:
transmitting, by the server, to one or more mobile devices at least one of: the raw sensor data, the motion state, and the functional state.

8. The method of claim 7, wherein the server only transmits to the one or more mobile devices that have been granted authorization, by the first mobile device, to receive the raw sensor data.

9. The method of claim 6, further comprising:
transmitting, by the server, to the first mobile device at least one of: the motion state, the functional state, and a timeline that replays activities based on the raw sensor data.

10. The method of claim 6, further comprising:
storing, by the server, a permission table that includes a list of one or more mobile devices authorized to receive the raw sensor data from the first mobile device;
receiving, by the server, a second authorization associated with a second mobile device authorized to receive the raw sensor data from the first mobile device;
updating, by the server, the permission table by adding the second mobile device to the list of the one or more mobile devices authorized to receive the raw sensor data; and
transmitting, by the server, to the one or more mobile devices, based on the updated permission table, at least one of: the raw sensor data, the motion state, and the functional state.

11. The method of claim 1, wherein the computing device is another mobile device.

12. A server for sharing sensor data, the server comprising:
a receiver configured to receive unprocessed sensor data, wherein the unprocessed sensor data includes compressed sensor data received from one or more sensors in a first mobile device, the one or more sensors including at least one motion sensor and the unprocessed sensor data including motion data from the at least one motion sensor;
a processor configured to:
decompress the compressed sensor data to obtain raw sensor data; and
determine a motion state of the first mobile device and a functional state associated with the motion state by analyzing the raw sensor data;
memory that stores a permission table that includes a list of one or more mobile devices authorized to receive information from the one or more sensors in the first mobile device; and
a transmitter configured to transmit to the one or more mobile devices based on the permission table at least one of: the unprocessed sensor data, the motion state, and the functional state.

13. The server of claim 12, wherein:
the receiver is further configured to receive an authorization authorizing a second mobile device to receive information from the one or more sensors in the first mobile device;
the processor is further configured to update the permission table by adding the second mobile device to the list of the one or more mobile devices authorized to receive information from the one or more sensors in the first mobile device.

14. The server of claim 12, the server further comprising:
a decompression module configured to decompress the compressed sensor data included in the received unprocessed sensor data.

15. The server of claim 12, the server further comprising:
a compression module configured to compress the unprocessed sensor data before transmitting the unprocessed sensor data.

16. The server of claim 12, wherein the permission table includes access rights for each mobile device in the one or more mobile devices, and wherein the access rights is chosen from a plurality of access levels.

17. The server of claim 12, wherein the permission table determines a type of sensor data to be transmitted to the one or more mobile devices, wherein the type of sensor data includes the unprocessed sensor data, the motion state and the functional state.

18. A method for transmitting sensor data, the method comprising:
receiving, by a first mobile device, raw sensor data from one or more sensors in the first mobile device, the one or more sensors including at least one motion sensor and the raw sensor data including motion data from the at least one motion sensor, wherein the raw sensor data is represented by a first number of datapoints, each datapoint including a sensor value and a time value;
compressing, by the first mobile device, the received raw sensor data into compressed sensor data represented by a second number of datapoints, wherein the second number of datapoints is less than the first number of datapoints; and
transmitting, by the first mobile device, the second number of datapoints to a computing device, wherein the computing device is configured to:
decompress the compressed sensor data into decompressed raw sensor data; and
determine, based on the decompressed raw sensor data, a motion state of the first mobile device and a functional state associated with the motion state.

19. The method of claim 18, wherein the computing device determines activities associated with the first mobile device based on the decompressed raw sensor data.

20. The method of claim 18, wherein the compression includes separating the first number of datapoints into a specific number of time intervals, and wherein one or more sensor values associated with one or more datapoints in each time interval is averaged.

21. The method of claim 18, wherein when the sensor value associated with each datapoint, from the first number of datapoints, are similar during a specific time duration, then the compression includes using a single sensor value for the specific time duration.

22. The method of claim 18, wherein the compression includes using a dependency relationship between the one or more sensors to filter out one or more datapoints from the first number of datapoints that are not relevant in determining activities associated with the first mobile device.

23. The method of claim 18, wherein the compression includes keeping a datapoint from the first number of datapoints, when the sensor value associated with the datapoint varies above a specific threshold in relations to the sensor value of a previous datapoint.

* * * * *